Jan. 31, 1961 M. W. MARIEN Re. 24,930

PISTON RING

Original Filed Dec. 22, 1958

Inventor
Melvin W. Marien

By Riley, Sherman, Merriam, Cross & Simpson Attys

United States Patent Office

Re. 24,930
Reissued Jan. 31, 1961

24,930

PISTON RING

Melvin W. Marien, Brentwood, Mo., assignor to Ramsey Corporation, St. Louis, Mo., a corporation of Ohio Original No. 2,932,543, dated Apr. 12, 1960, Ser. No. 781,978, Dec. 22, 1958. Application for reissue May 23, 1960, Ser. No. 32,071

14 Claims. (Cl. 309—45)

Matter enclosed in heavy brackets [ ] appears in the original patent but forms no part of this reissue specification; matter printed in italics indicates the additions made by reissue.

The present invention relates broadly to circumferentially expansible and contractible piston rings, and is more particularly concerned with a piston ring structure constructed to prevent circumferential jamming and substantial oil leakage therethrough during operation.

There is known to the art a piston ring construction comprising a pair of axially spaced ring portions provided with circumferentially staggered and radially extending grooves or gaps therein to accommodate the desired circumferential expansion and contraction. The gaps or grooves are designed to have sufficient width so that the gaps remain open when the ring is in operating position in the piston ring groove. However, due to manufacturing difficulties imposed by close tolerances, it has been found that on many occasions when the piston ring is at working diameter the gaps are closed and the ring portion segments abut one another, producing a circumferential jamming of the ring in the piston groove and creating a condition in which the rings are in effect too large for the cylinder. This is of course an intolerable situation, and even wherein the gaps or slots remain partially open, there occurs oil pumping or leaking through the slots or gaps, particularly under high vacuum conditions.

It is accordingly an important aim of the present invention to provide a circumferentially expansible and contractible piston ring structure which effectively avoids the jamming problem noted in the preceding paragraph, and which further reduces to a minimum the possibility of oil leakage therethrough.

Another object of this invention lies in the provision of a piston ring construction wherein one or more relatively wide expansion gaps or spaces are provided and remaining circumferentially staggered gaps or spaces are essentially closed when the piston ring is in operating position.

Still another object of the present invention is to provide a piston ring of the foregoing character which when at working or operating diameter has essentially all axially spaced and circumferentially movable segments in abutment, with the exception of a controlled number of pairs of said segments circumferentially spaced from one another a lesser distance than when the piston ring is at free diameter.

A further object of the invention is to provide a piston ring comprising a ring member providing axially spaced segmental portions, each of said portions having circumferentially staggered slots therein the major number of which are of relatively lesser width than the minor number of said slots, so that upon compression of the ring member to operating position only the minor number of the slots remain open and the major number thereof are essentially closed.

Other objects and advantages of the present invention will become more apparent during the course of the following description, particularly when taken in connection with the accompanying drawings.

In the drawings, wherein like numerals are employed to designate like parts throughout the same:

Briefly stated, the present invention is directed to a piston ring structure which avoids the earlier problem of circumferential jamming and additionally substantially reduces oil leakage, these advantages being obtained by provision of a ring member comprising at least two axially spaced portions provided along their inner diameters with circumferentially spaced and radially inwardly opening notches. Connecting with alternate notches in the axially spaced portions are slots or gaps extending radially outwardly, at least one of the slots or gaps being of relatively greater width than the other of said slots whereby during compression of the ring member to operating or working position said slot remains open to accommodate expansion or contraction during use, thereby avoiding jamming of the ring member in a circumferential direction. The remaining slots, however, are essentially closed during operation to reduce oil leakage, and accordingly, the ring segments provided by said notches and slots abut. The single relatively wider opening slot can be diametrally opposed to or on either side of the normal break or joint in the ring member, and it is within the contemplation of this invention that two or three relatively wide gaps may be employed, circumferentially spaced with respect to the ring break or joint. Other structural features of the present invention will become apparent as the description now proceeds.

Figure 1:
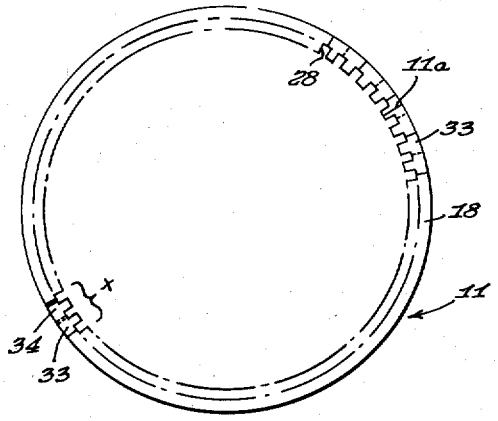
Figure 1 is a plan view of a piston ring according to the principles of this invention, with parts broken away to more clearly illustrate features thereof.
Figure 6:
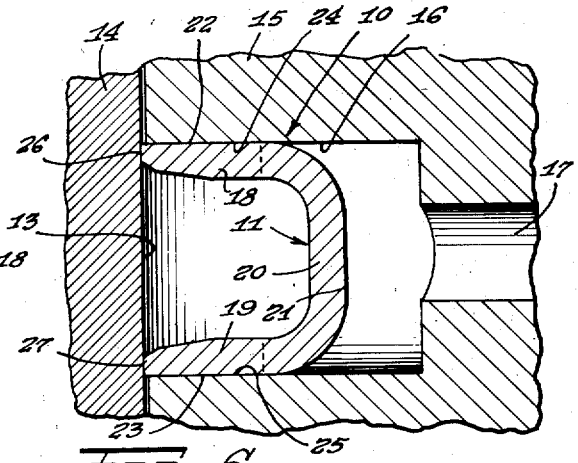
Figure 6 is a fragmentary sectional view of piston and cylinder structure, showing the piston ring of this invention located in the oil ring groove of the piston.

Referring now first to Figures 1 and 6, a piston ring assembly as provided by this invention is designated generally by the numeral 10 and comprises a ring member indicated in its entirety by the numeral 11. The piston 15 is provided with a groove 16 receiving the ring member 11, and communicating with said groove is a drain hole 17 formed in the piston 15.

The ring member 11 with which this invention is particularly concerned is provided with a break or joint 11a extending therethrough, and when the ring member 11 is at free diameter a minor amount of overlap is provided between the opposite ends of the ring member in accordance with preferred commercial practice. Thus, the free diameter with ends abutted is slightly larger than the operating diameter. The ring member is shown in the drawings as being essentially U-shaped in cross-section, although it will of course be appreciated that variations in shape may be effected, and for one example, the ring member may have a configuration resembling an E when viewed in cross-section. As herein disclosed, however, the ring member comprises a pair of axially spaced leg members 18 and 19 connected by a base or bight portion 20. The leg members 18 and 19 are preferably generally flat along their axial outward surfaces 22 and 23 for flush contact with surfaces 24 and 25 defining the axial width of the groove 16. As appears in Figure 6, the ring member 11 is in sliding sealing contact with the surface 13 of the cylinder 14 by circumferential edge portions 26 and 27 on the leg members 18 and 19.

The inner diameter of the ring member 11 is provided with a plurality of circumferentially spaced notches or cutout portions 28 which are generally U-shaped in plan with the notches in the leg member 18 being vertically or axially aligned with the notches in the leg member 19. It is to be seen that the notches 28 are essentially straight-walled, and in Figure 2, which is a fragmentary plan view of the ring member taken adjacent the joint 11a, it is to be seen that the notches 28 generally centrally of the width thereof connect with circumferentially staggered slots or gaps, the slots in the leg member 18 being designed at 29 and the slots in the leg member 19 being identified by the numeral 30. This configuration of notches 28 and slots 29—30 extends generally throughout the circumference of the ring member 11 in opposite circumferential directions from the joint 11a to a location, in this instance, diametrally opposed to the joint 11a, at which location the slot configuration of Figure 3 is employed to avoid the circumferential jamming and oil leakage problems earlier noted. While substantially improved results are obtained by employing the slot configuration of Figure 3 in a diametrally opposed location to the joint 11a, the improved slot configuration may be employed at two or three circumferentially spaced locations along the ring member 11 or at either side of the ring joint 11a.

The notches 28 at the location diametrally opposite to the joint 11a, said location being identified in Figure 1 by the legend x, are essentially identical to other notches in the ring member 11; however, connecting with the notches 28 in the location x is a pair of relatively wider gaps or slots, the gap in the leg member 18 at this location being referred to as 31 and the slot or gap in the leg member 19 being identified by the numeral 32. As is appreciated all slots or gaps 29—32 have essentially the same radial length and terminate at generally the junctures of the leg members 18—19 and the base or bight portion 20.

By provision of the notches 28 and slots 29 and 30 there is formed a plurality of ring segments 33 defined as to circumferential width by the slots 29 and 30. At the location x, on the other hand, the notches 28 and slots or gaps 31 and 32 provide a single ring segment 34, the circumferential width of which is defined by said slots 31 and 32. It is thus to be seen upon consideration of Figures 2 and 3, showing portions of the ring member 11 in essentially its free or maximum diameter condition, the slots or gaps 29 and 30 are lesser width than the slots 31 and 32, and in commercial practice the width or opening of the gaps 31 and 32 at free diameter may be essentially twice that of the gaps 29 and 30.

By provision of the variable width slot construction herein disclosed, the slots or gaps 29 and 30 are essentially closed when the ring member 11 is in operation position, while the slots 31 and 32, although decreasing in opening, do not during operation reach a closed condition. This is illustrated in Figures 4 and 5, which are fragmentary plan views of the same portions of the ring member 11 as shown in Figures 2 and 3. It is to be seen from the former figures that the ring segments 33 abut one another when the ring member 11 is in operating position, that the notches 28 are of relatively lesser width than when the ring member is at free diameter, that the slots or gaps 30 are essentially closed, and that the slots or gaps 31 and 32 in the location x remain in an open, although reduced width position. While commercial practices may require variations, the width of the slots or gaps 31 and 32 when the ring member 11 is in operating position is generally the same as the width of the slot 29 when the ring member is at free diameter.

Figure 2:
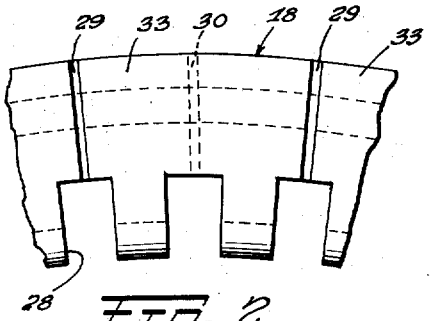
Figures 2 and 3 are fragmentary plan views of diametrally opposed portions of the piston ring, showing the major number and minor number, respectively, of gaps or slots when the ring is at essentially the free diameter.
Figure 3:
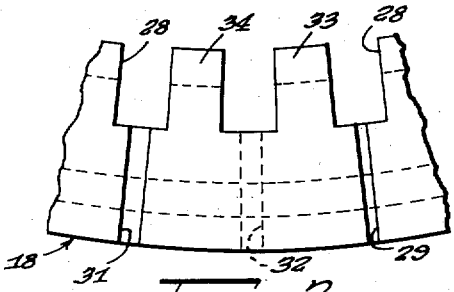
Figure 4:
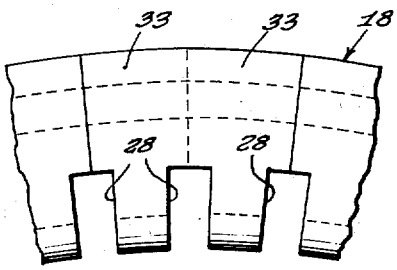
Figures 4 and 5 are fragmentary plan views of the same portions of the piston ring, and showing the respective gap arrangement when the piston ring is at operating diameter.
Figure 5:
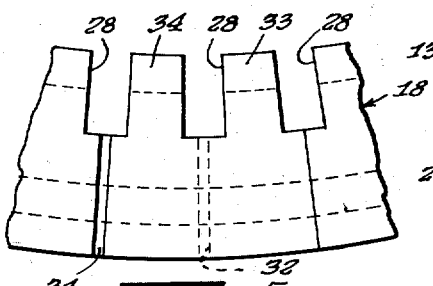

Stated otherwise, as the ring member 11 is compressed from the free diameter condition of Figures 2 and 3 to the working diameter condition of Figures 4 and 5, the gaps 29—32 are compressed as tension in the ring member is built up. However, prior to the ring member reaching operating or working diameter, the slots or gaps 29 and 30 are closed, and while the slots 31 and 32 are reduced in opening or width, these latter slots remain open, and a space exists between the ring segment 34 and adjacent ring segments 33. There thus remains in the entire ring member 11 a slot or gap in the leg members 18 and 19 of sufficient width to accommodate such contraction and expansion as may be encountered during reciprocal movement of the piston 15 relative to the cylinder 14. Accordingly, in contrast to the prior art piston ring structures, all ring segments do not abut and there is by this arrangement avoided the condition of circumferential jamming of all segments such that the ring member appears to be too large for the cylinder. In addition, however, by provision of a minor number of slots or gaps which remain open, the major number of the slots or gaps being closed, oil leakage through the ring member is reduced to the minimum. While, as noted, only a single pair of slots 31—32 is required to accomplish the improved results herein stated, two or three pairs of said slots may be utilized, and viewing Figure 1, such pairs of slots may be spaced from the joint 11a 90 or 120° from said joint, or may be relatively closely circumferentially spaced to the location x, or relatively close to the joint 11a.

It is to be seen from the foregoing that applicant has provided a piston ring structure comprising axially spaced ring portions having circumferentially spaced notches along the inner diameter thereof alternately connecting with radially outwardly extending slots, the major number of which are closed when the piston ring is in operating position and the minor number of which are open when the ring is in said position. Thereby, sufficient circumferential movement of the ring can occur to avoid jamming, and at the same time, oil leakage through the piston ring is markedly reduced.

Various modifications may of course be effected in the structure herein disclosed without departing from the novel concepts of the present invention.

I claim as my invention:

1. A piston ring, which comprises a ring member providing axially spaced ring portions having circumferentially spaced openings therein along the inner and outer diameters thereof, with the openings in one ring portion staggered with respect to the openings in another ring portion, the openings along one diameter varying as to width and the relatively narrow openings being greater in number than the relatively wider openings so that upon compression of the ring member to operating position the relatively narrow openings are essentially closed and the relatively wide remain open, thereby substantially eliminating circumferential jamming of the ring member and reducing oil leakage therethrough.

2. A piston ring, which comprises a ring member providing axially spaced ring portions having radially extending openings therein along the inner and outer diameters thereof, with the openings in one ring portion circumferentially spaced and staggered with respect to the openings in another ring portion, the openings along one diameter varying as to width and the relatively narrow openings being greater in number than the relatively wider openings so that upon compression of the ring member to operating position, the relatively narrow openings are essentially closed and the relatively wide remain open, thereby substantially eliminating circumferential jamming of the ring member and reducing oil leakage therethrough.

3. A piston ring, which comprises a ring member providing axially spaced ring portions notched at circumferentially spaced locations along one diameter and having circumferentially spaced slots along the other diameter connecting with alternate notches, the slots along said other diameter varying as to width and the relatively narrow slots being greater in number than the relatively wider slots so that upon compression of the ring member to operating position the relatively narrow slots are essentially closed and the relatively wide remain open, thereby substantially eliminating circumferential jamming of the ring member and reducing oil leakage therethrough.

4. A piston ring which comprises a ring member providing axially spaced ring portions having circumferentially spaced openings therein, with the openings in one ring portion staggered with respect to the openings in another ring portion, the opening in one ring portion and the adjacent opening in another ring portion comprising a pair of openings, generally not more than three pairs of said openings being of relatively greater circumferential width than the remaining pairs of openings so that upon compression of the ring member to operating position the said three pairs of openings remain open and the remaining pairs are essentially closed, thereby substantially eliminating circumferential jamming of the ring member and reducing oil leakage therethrough.

5. A piston ring, which comprises a ring member providing axially spaced ring portions notched at circumferentially spaced locations therealong and having circumferentially spaced slots connecting with alternate notches to provide a plurality of pairs of axially spaced ring segments circumferentially spaced when the ring member is at free diameter, not more than one pair of said segments being circumferentially spaced from an adjacent pair when the ring member is at operating diameter to thereby substantially eliminate circumferential jamming of the ring member and reduce oil leakage therethrough.

6. A piston ring, which comprises a ring member generally U-shaped in cross-section and providing a pair of axially spaced leg portions having circumferentially spaced openings therein along the inner and outer diameters thereof, with the openings in one leg portion staggered with respect to the openings in the other leg portion, the openings along one diameter varying as to width and the relatively narrow openings being greater in number than the relatively wider openings so that upon compression of the ring member to operating position the relatively narrow openings are essentially closed and the relatively wide openings remain open, thereby substantially eliminating circumferential jamming of the ring member and reducing oil leakage therethrough.

7. A piston ring, which comprises a ring member generally U-shaped in cross-section and providing a pair of axially spaced leg portions having a plurality of circumferentially spaced notches opening radially inwardly along the inner circumference and a plurality of circumferentially spaced slots connecting with alternating notches and terminating at the bight portion of said ring member, one slot in one of the leg portions and an adjacent slot in the other leg portion being of relatively greater circumferential width than the remaining slots, whereby when the ring member is at free diameter the relatively wider slots are of greater opening than the remaining slots and when the ring member is at working diameter only the relatively wider slots remain open, thereby substantially eliminating circumferential jamming of the ring member and reducing oil leakage therethrough.

8. In an oil seal ring assembly which includes a cylinder, a piston having an oil ring groove and movable in the cylinder and an expander ring in said groove, the improvement which comprises a ring member backed by said expander ring, said ring member providing axially spaced ring portions in rubbing contact with the cylinder and having circumferentially spaced openings therein along the inner and outer diameters thereof, with the openings in one ring portion staggered with respect to the openings in another ring portion, the openings along one diameter varying as to width and the relatively narrow openings being greater in number than the relatively wider openings so that upon compression of the ring member to operating position the relatively narrow openings are essentially closed and the relatively wide openings remain open, thereby substantially eliminating circumferential jamming of the ring member and reducing oil leakage therethrough.

9. In an oil seal ring assembly which includes a cylinder, a piston having an oil ring groove and movable in the cylinder and an expander ring in said groove, the improvement which comprises a ring member backed by said expander ring, said ring member being generally U-shaped in cross-section and providing a pair of axially spaced ring portions in rubbing contact with the cylinder and having a plurality of circumferentially spaced notches opening radially inwardly along the inner circumference and a plurality of circumferentially spaced slots connecting with alternating notches and terminating at the bight portion of said ring member, one slot in one of the leg portions and an adjacent slot in the other leg portion being of relatively greater circumferential width than the remaining slots, whereby when the ring member is at free diameter the relatively wider slots are of greater opening than the remaining slots and when the ring member is at working diameter only the relatively wider slots remain open, thereby substantially eliminating circumferential jamming of the ring member and reducing oil leakage therethrough.

*10. A circumferentially expansible and contractible piston ring, comprising axially spaced ring portions each composed of connected together circumferential segments with contraction gaps therebetween, and some of said gaps being wider than others to accommodate for the contraction of the ring when the narrow gaps are closed.*

*11. A circumferentially expansible and contractible piston ring, comprising axially spaced connected ring portions each of which is provided with circumferentially spaced contraction gaps, at least one of which is wider than the others to accommodate for the contraction of the ring when the narrow gaps are closed.*

*12. A circumferentially expansible and contractible piston ring, comprising a pair of ring portions, and strut means connecting said ring portions to maintain them in axially spaced relation, each of said ring portions being slotted from the inner to the outer diameter thereof to provide circumferentially spaced contraction gaps, at least one of which is wider than the others to accommodate for the contraction of the ring when the narrow gaps are closed.*

*13. A circumferentially expansible and contractible piston ring, comprising axially spaced ring portions each composed of connected together circumferential segments spaced variable distances apart in a circumferential direction when the ring is expanded to accommodate for the contraction of the ring so that at least a pair of said segments remain spaced while the remaining segments abut to eliminate circumferential jamming of the ring and reduce oil leakage therethrough.*

*14. A circumferentially expansible and contractible piston ring, comprising axially spaced ring portions having circumferentially spaced openings along the inner and outer diameters thereof, the openings along one diameter varying as to width and the relatively narrow openings being greater in number so that upon compression of the ring to operating position the relatively narrow openings are essentially closed and the relatively wide openings remain open, to eliminate circumferential jamming of the ring and reduce oil leakage therethrough.*

References Cited in the file of this patent or the original patent

UNITED STATES PATENTS

| | | |
|---|---|---|
| 2,484,288 | Hamm | Oct. 11, 1949 |
| 2,645,536 | Prasse | July 14, 1953 |
| 2,673,770 | Shirk | Mar. 30, 1954 |

FOREIGN PATENTS

| | | |
|---|---|---|
| 122,054 | Great Britain | Jan. 16, 1919 |